Feb. 10, 1959 W. J. BIEGANSKI ET AL 2,873,438

MAGNETIC SHIFT REGISTER

Filed Feb. 24, 1956

INVENTORS.
Wladyslaw J. Bieganski
& Lester M. Glickman
BY Morris ... [signature]
ATTORNEY.

Patented Feb. 10, 1959

2,873,438

MAGNETIC SHIFT REGISTER

Wladyslaw J. Bieganski and Lester M. Glickman, Camden, N. J., assignors to Radio Corporation of America, a corporation of Delaware Application February 24, 1956, Serial No. 567,488

7 Claims. (Cl. 340—174)

This invention relates to magnetic systems and particularly to magnetic shift registers.

Magnetic systems for handling binary signals have been developed that employ magnetic cores made of material having a substantially rectangular hysteresis characteristics. These magnetic systems have the advantages of small size, and relatively long life. Among such systems that have been developed are magnetic shift registers. In such registers, binary signals are stored in magnetic cores in the form of the residual flux of the cores, which flux may assume either one of two directions. An example of a magnetic shift register is described in an article by Ramey entitled "A Single-Core Magnetic Amplifier as a Computer Element," Transactions of the A. I. E. E. of January 1953, page 442. Magnetic shift registers have been found useful in ring counter, switching, information handling, and pulse commutating circuits.

In one type of magnetic shift register, a winding linked to a core is coupled to a winding linked to a succeeding core through a coupling circuit that is used, amongst other things, to provide driving voltages for these windings. These coupling circuits between adjacent cores are alternately in active and inactive states. The active state is when signals are being transferred from one core to the succeeding one. At any instant, an active coupling circuit is succeeded by an inactive circuit, which inactive circuit, in turn, is succeeded by an active circuit. The adjacent active and inactive circuits tend to be transformer coupled through common magnetic cores. As a result, any current flow in an inactive circuit would tend to be reflected in an adjacent active circuit, and cause the development of spurious signals. These spurious signals present difficulties especially in any practical circuit design requiring substantial tolerances in the power supply and in the components.

It is among the objects of this invention to provide:

A new and improved magnetic system;

A new and improved magnetic shift register in which the development of spurious signals is prevented;

In accordance with this invention a plurality of magnetic cores are coupled in a serial order by means of circuits, each of which includes two loops and a common load impedance. Each loop separately includes a winding on one of the cores, a unilateral impedance, and a source of alternating voltage pulses, all connected in the same series circuit with the common load impedance. The common load includes another unilateral impedance and means for supplying a bias voltage thereto tending to draw current in the forward direction. At least one of the loops includes within its series circuit means for supplying a voltage tending to oppose a forward voltage drop across the load unilateral impedance.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figures 1, 2, 3, 4:
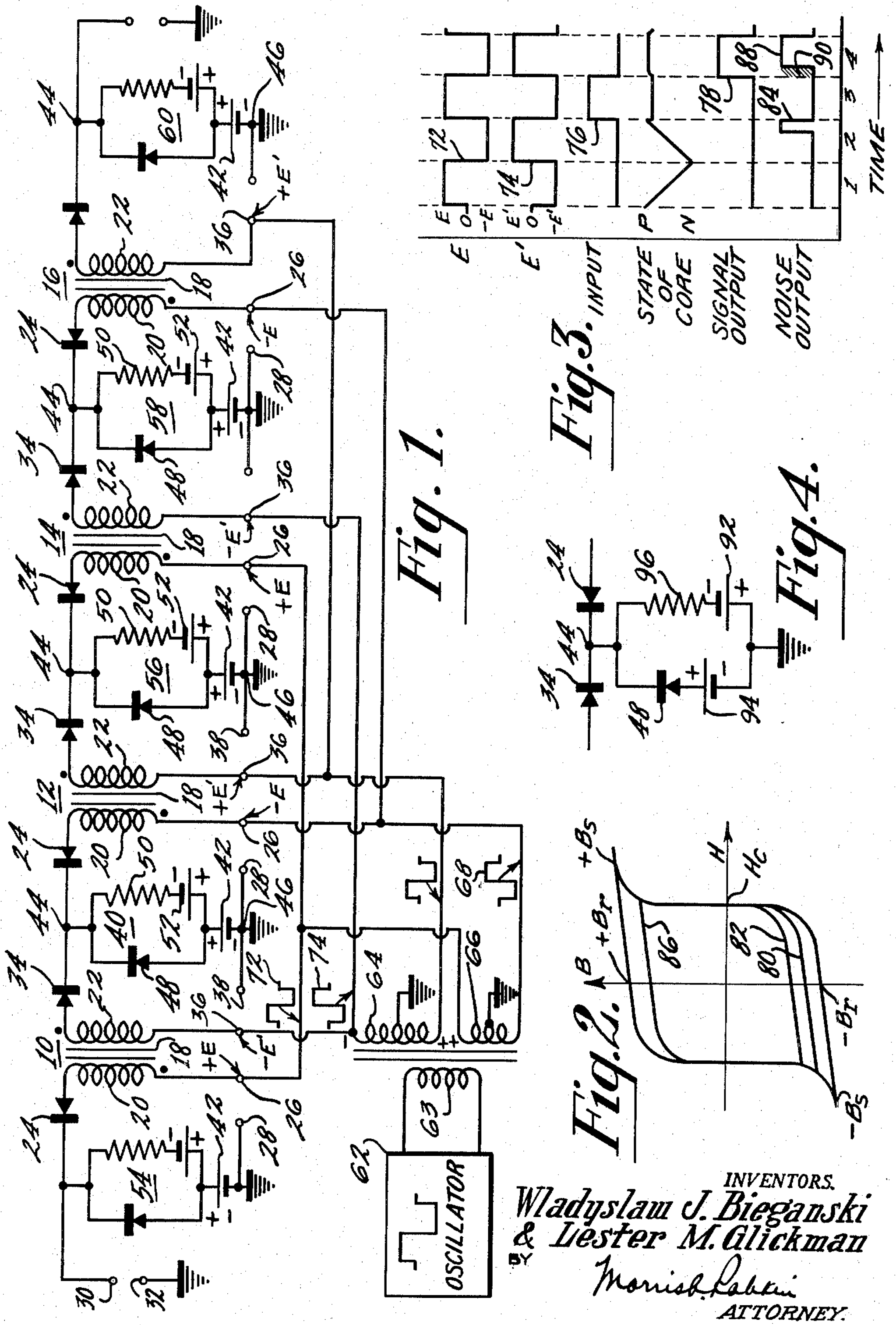
Figure 1 is a schematic circuit diagram of a magnetic stepping register embodying this invention.
Figure 2 is an idealized graph of a hysteresis curve of magnetic core materials used in the device of Figure 1.
Figure 3 is an idealized graph of waveforms occurring in portions of the circuit of Figure 1.
Figure 4 is a schematic circuit diagram of a portion of a circuit embodying a modification of this invention.

Referring to Figure 1, a plurality of magnetic devices 10, 12, 14, 16 are connected in cascade as a stepping register. The devices 10, 12, 14, 16 are the same, except where noted below. Therefore, only the first device, 10 is described in detail; corresponding reference numerals are generally used for similar parts in the other devices 12, 14, 16. A saturable magnetic core 18 is employed that is made of a magnetic material having appreciable remanence and, preferably, having a substantially rectangular hysteresis curve of the type shown in Figure 2. Desirable characteristics of the core material are a high saturation flux density $B_m$, a high value of residual flux density $B_r$ and a low coercive force $H_c$. Opposite directions of flux in the core 18 are represented by P and N.

The device 10 includes a primary or reset winding 20 and a secondary or gating winding 22. Dots adjacent the windings indicate the relative senses of linkage in accordance with the usual transformer convention. The primary winding 20 is connected in a series circuit that also includes a diode 24, a pair of alternating current (A.-C.) terminals 26, 28, and a pair of input terminals 30, 32. One 32 of these input terminals is connected to a reference potential shown as the conventional ground symbol. This ground connection also serves as a common A.-C. ground for the terminal 28. The secondary winding 22 is connected in a series circuit that also includes a diode 34, a pair of A.-C. terminals 36, 38, a load circuit 40, a direct voltage source shown as a battery 42, and a pair of output terminals 44, 46 across the series combination of the load 40 and the battery 46. The terminal 46 is grounded.

The load 40 is made up of two parallel branches. One branch includes a diode 48, and the other branch includes a resistor 50 and a direct voltage source 52. The junction of the cathode of the diode 48 and a terminal of the resistor 50 is connected to the output terminal 44. The junction of the anode of the diode 48 and the positive terminal of the source 52 is connected to the positive terminal of the source 42. A similar series combination of a load circuit 54 and a voltage source 42, all connected across the input terminals 30, 32, may form the input circuit of the device 10. This load 54 may be the output load of another magnetic device (not shown). The output terminals 40, 46 of the device 10 form the input terminals of the device 12. The devices 12, 14, and 16 have similar load circuits 56, 58, and 60, respectively, and the output terminals of each device are the input terminals of the succeeding device. The output terminals 44, 46 of the last device 16 may be used as the output terminals of the register. The diodes may be semiconductors, for example, of the germanium type.

The A.-C. power supply includes an oscillator 62 for supplying pulses of alternately opposite polarities. These pulses may be rectangular waveforms, as shown in the drawing, or they may be any other appropriate form such as sine waves. The oscillator 62 is connected to the primary 63 of a transformer that has two secondaries 64, 66 with grounded center taps. One terminal of the secondary 64 is connected to the A.-C. terminals 36 of the second and fourth devices 12 and 16 to supply rectangular voltage waveforms 70; the other terminal of this secondary 64 is connected to the A.-C. terminals 36 of the devices 10 and 14 to supply waveforms 74 of opposite phase. The other secondary 66 is connected to supply rectangular voltage waveforms 68 to the A.-C. terminals 26 of the second and fourth devices 12 and 16 and waveforms 72 of opposite phase to the A.-C. terminals 26 of the first and third devices 10 and 14. The rectangular waveforms 72 and 74 respectively supplied to the primary and secondary terminals 26 and 36, respectively, of the devices 10 and 14 are of opposite phase, as are the waveforms 68 and 70. The secondaries 64, 66 are arranged to provide primary and secondary voltages at the terminals 26 and 36, respectively, that are substantially equal to the primary-to-secondary turns ratio of the windings 20 and 22. This turns ratio is less than unity, i. e., a step-up primary-to-secondary turns ratio.

Waveforms occurring in portions of the circuit of Figure 1 are shown in Figure 3. All the cores 18 are assumed to be in state P initially (the beginning of time interval 1, Fig. 3). Any input pulses at the terminal 30 are positive going with respect to ground and are substantially coincident with the first half-cycles (e. g. time intervals 1 and 3 of Figure 3) of the A.-C. pulses applied to the terminal 26 of the device 10. Shown in Figure 1 are the relative polarities with respect to ground of the voltages at the A.-C. terminals 26, 36 existing during time interval 1 of Figure 3.

At that time interval 1, it is assumed, there is no input pulse. A positive-going pulse 72 is applied to the A.-C. terminal 26 of the first device 10, which pulse is passed by the diode 24 in the forward direction and by the load circuit 54 (in a manner described below). This pulse 72 energizes the primary winding 20, and the magnetization of the core 18 is changed from state P to state N; this operation is sometimes called "resetting" the core. The voltage induced in the secondary winding 22 with a change of state of the core is opposed by and approximately equal to the negative-going pulse 74 applied to the terminal 36; thus, this pulse 74 tends to prevent current flow in the secondary circuit of the device 10.

At time interval 2, the positive-going portion of the waveform 74 is applied to the terminal 36 to energize the secondary winding 22. The polarity of this pulse is such that the state of the core is changed back from state N to state P; this operation is sometimes called "gating" the core. Primary circuit current due to a voltage induced in the primary 20 tends to be opposed by the negative-going portion of the waveform 72. Substantially the full voltage E′ of the waveform 74 is dropped across the relatively large impedance of the winding 20 during this change of state of the core; there is a negligible voltage drop across the load 40 which has a relatively small impedance.

The bias current in the load diode 48 due to the battery 52 and the resistor 50 is of the order of (and generally slightly greater than) twice the magnetizing current through the secondary winding during the change of core state. During the second half cycle, time interval 2, there is a resetting current in the primary winding 20 of the second device 12 due to the positive-going, second half-cycle of the waveform 68. The gating current for the device 10 and the resetting current for the device 12 flow in the same direction through the load 40. This combined current does not exceed the bias current in the load diode 48; therefore, there is substantially no change in voltage across the load 40. Accordingly, in the absence of an input pulse, the first or resetting half-cycle of the voltage E drives the first device core 18 to state N, and the second or gating half-cycle of E′ returns this core to state P without a change in voltage across the load 40.

During time interval 3 (Figure 3), it is assumed, a positive-going input pulse 76 is applied to the terminal 30. This pulse is larger than and opposes the positive-going resetting pulse of the waveform 72. As a result, the primary circuit diode 24 is blocked, and there is no magnetizing current in the primary winding 20. The state of the core 18 remains unchanged in state P.

During time interval 4 (Figure 3), the positive-going gating pulse of the waveform 72 is presented with a negligible impedance in the winding 22 of the first device 10, due to the core 18 being already in state P. Due to the low impedance of the secondary winding 22 with the core 18 saturated, the secondary current is substantially increased in excess of the bias current in the load diode 48. As a result, this diode 48 is blocked, and the resistance of the load 40 rises to approximately the resistance of the load resistor 50. Thus, substantially the full voltage E′ is impressed across the load 40 to produce a positive-going pulse 78 at the output terminal 44 of the device 10. Accordingly, when an input pulse 76 is received at the terminal 30, an output pulse 78 is produced at the terminal 44 with a half-cycle delay. Likewise, in the absence of an input pulse, there is no output pulse a half-cycle later.

The other devices 12, 14, 16 operate in the same manner; the resetting and gating operation of the second device 12 is delayed one half-cycle behind the first 10, the third device 14 is one half-cycle behind the second device 12, and so on. The first device output pulse 78 at the terminal 44 is an input pulse for the second device 12. This pulse 78, occurring during gating of the first device 10, blocks the resetting action in the second device 12. A half-cycle later, when the second device 12 is gated, this device 12 produces an output pulse across the load 56 to block resetting action in the third device 14. Thus, the devices 10 to 16 operate to step along input signals received at the terminal 30 (these signals being either a pulse or the absence of a pulse), and this stepping action involves a half-cycle delay from each device to the succeeding one.

With the instantaneous voltage polarities at the terminals 26 and 36 shown in Figure 1, at time interval 1, magnetizing currents are carried by the input load 54, the second device load 56, and the fourth device load 60. The alternate loads 40 and 58 are inactive and do not carry resetting and gating currents. At time interval 2, the loads 40 and 58 carry the resetting and gating currents magnetizing the adjacent cores; and the loads 54, 56, and 60 are inactive.

The function of the direct voltage sources 42 may be appreciated by considering the operation of the circuit without these sources 42. The following explanation may not be fully established, but it appears to explain the observed phenomena. In each of the loads, e. g. the third device load 58, there is a quiescent current flow through the load diode 48. This diode current produces a finite, though small, voltage drop in the forward direction of the diode 48. The diode voltage drop may only be, for example, of the order of tenths of a volt compared to signal voltage pulses of the order of ten volts. Nevertheless, due to the quiescent operating voltage at the terminal 44 being below ground, there tends to be a material effect on the overall circuit operation. The loop equation for the primary circuit of the third device 14 (assuming no input pulse to oppose resetting) during the change of state of the core 18 in time interval 1 (and without the sources 42 in the circuits) may be written as follows:

$$E-e_{20}-e_{24}+e_{56}=0 \qquad (1)$$

where E is the voltage at the terminal 26, $e_{20}$ is the voltage across the primary winding 20, and similar notation is used for the voltages across the diode 24 and the load 56. The secondary loop equation is $$Ne_{20}-E'-e_{34}+e_{58}=0 \qquad (2)$$

where N is the primary-to-secondary turns ratio. The first term of Equation 2 is the voltage induced in the secondary winding 22. The relationship of the turns ratio N and the operating voltages E and E′ has been defined to be (3) $$NE=E'$$

These equations may be combined by eliminating E in Equation 1 in accordance with Equation 3, and by eliminating $e_{20}$ in Equation 2 in accordance with Equation 1. Solving for the voltage $e_{34}$, the resulting equation is (4) $$e_{34}=N(e_{56}-e_{24})+e_{58}$$

There is generally some bias current flowing in the primary load 56 during the resetting of the core 18. As a result, there is generally a voltage across the load 56 which is opposite to and of the same order as the drop across the primary diode 24. Thus, the term in parentheses in Equation 4 is usually not negative, and the right side of this equation is positive. Under such circumstances, this Equation 4 indicates that there is a net forward voltage across the secondary diode 34, which voltage produces current flow in the secondary circuit.

This secondary current acts as an additional load upon the primary circuit resulting in an increase in primary current. The primary current tends to increase beyond the value of the diode bias current in the primary load 56, thereby increasing the resistance of this load 56 to that of the resistor 50. Such an increase in the resistance of the load 56 reduces the portion of the operating voltage E that is effective as a resetting voltage across the primary winding 20. This reduction in resetting voltage, in turn, reduces the secondary current. The effective resetting voltage tends to stabilize at a value at which the secondary current almost ceases to flow.

The operating voltage pulse amplitude E and the time duration of the pulses may be chosen (in accordance with one circuit design) to provide a volt-microsecond integral that is sufficient to change the flux in the core completely from remanence in one state to saturation in the other. As a result of the aforementioned reduction in resetting voltage due to secondary current, the core 18 does not reset completely; that is to say, the core 18 is driven to a point on the hysteresis curve that corresponds to a flux density less than saturation $-B_s$. The core tends to operate on a reduced loop referenced by the numeral 80.

In the succeeding gating half-cycle (time interval 2) the gating voltage E′ will be more than enough to drive the core back to saturation $+B_s$. As a result, the core saturates before the gating pulse terminates, which saturation has the effect of permitting the full gating voltage E′ to appear as a noise pulse 84 (Fig. 3) across the load 58 for a portion of the time at the end of the gating half-cycle.

This noise pulse 84, in turn, opposes the resetting pulse in the primary winding 20 of the fourth device 16. The effect of this opposing noise pulse is similar, for its duration, to the effect of a signal pulse in that the resetting of the core is prevented. This noise pulse effect, in the fourth device 16, is in addition to the secondary-current loading effect that takes place in the fourth device 16 similarly as in the third device 14. Therefore, the core 18 of the fourth device 16 is reset even less, operating on a reduced hysteresis loop, for example, that referenced by numeral 82. Likewise, the fourth device 16 gates even earlier than the third device 14, and the resulting noise pulse is of longer duration than the first one 84. This process is cumulative, and with a sufficient number of repeated operations in succeeding devices (not shown), the noise pulse duration may be substantially the same duration as a single pulse. Thus, this operation may culminate in the generation of a spurious signal pulse.

The voltage sources 42 prevent this generation of spurious pulses and, thus, ensure reliable circuit operation. In general, the voltage of the source 42 may be adjusted to be such that there is a net back voltage across the secondary diode 34 during the resetting operation. As a result, there is no secondary current flow to load the primary circuit. Accordingly, the resetting voltage is not reduced, and the cores are reset to saturation.

The problem solved by this invention arises because of the setting of tolerances in any practical circuit design. Tolerances in uniformity are set, for example, in the driving voltage amplitudes, in the diode characteristics, in the magnetic core materials and other characteristics. The above discussion of Equation 4 includes the statement that the right side of the equation is usually positive. This statement is based on observations of a circuit having the specific parameters set forth below, in which circuit the tolerances are generally of the order of 10%. At one extreme of the range of circuit conditions, certain ones of the stages may operate properly without requiring the bias of the voltage sources 42. However, these sources 42 are needed for reliable operation of all the stages over a substantial range of conditions.

For example, a noise pulse 84 is generally produced whenever the gating (secondary) voltage E′ is more than enough to return the core to saturation $+B_s$. This "over gating" tends to block the resetting of the next core, in the manner described above, and may ultimately result in a spurious pulse that is of the same duration as a signal pulse.

Unstable operation may also occur due to the gating voltage being sufficient only to drive a core from $-B_s$ to a point on the hysteresis loop below $+B_s$ so that the core operates on a minor hysteresis loop such as that referenced by the numeral 86. If the stage that includes the core operating in this manner next receives an input pulse 76, the resetting pulse is blocked, and the core is at positive remanence on the minor loop 86 when the succeeding gating half-cycle starts. An initial portion of this gating voltage is consumed in driving the core to $+B_s$ from the remanent position on the loop 86. The remaining portion of this gating voltage is developed across the output load as an output pulse to block reset of the succeeding core. This output pulse is referenced by the numeral 88 in Figure 3, and the time period 90 of the initial gating portion that is consumed driving the core to saturation at $+B_s$ is indicated by hatching. During this initial portion 90 of the gating pulse, the succeeding core starts to reset toward $-B_s$ from its position on a minor loop such as the loop 86. As a result, in the subsequent gating of this core, more of the gating voltage is consumed in driving the core to saturation at $+B_s$, and an output pulse 88 is even shorter in duration. This process culminates in the loss of a signal pulse, i. e., in the development of a spurious absence-of-a-pulse.

A stepping-register circuit of this type should be designed to handle reliably the signals that it receives, that is, spurious signals should not be developed. As indicated, spurious pulses tend to be generated if the driving voltages are too large; and signal pulses tend to be lost spuriously if these voltages are too small. Design of this circuit involves allowing for a large range of voltage fluctuation for circuit operation without generating spurious signals, in order to accommodate the necessary tolerances. By means of the direct voltage sources 42, the upper stable limit of the driving voltages is raised, because the gating voltage (which, in excess, tends to generate a spurious pulse) is opposed, and because the secondary loading effects (which tend to reduce the primary, resetting voltage) are substantially eliminated. However, the lower stable limit of the driving voltages is also raised by these voltage sources 42; i. e. the loss of signal pulses tends to occur at a high gating voltage due to the opposing voltages of the sources 42. Notwithstanding the latter lower-limit increase, a net increase in the range of stable operation may be provided due to the elimination of the secondary loading effects.

The value of the bias provided by the sources 42 may be chosen to permit the greatest range of voltage fluctuation, consistent with the necessary tolerances, within which the circuit operates stably. The state of the art is such that it is generally not possible, under this criterion, to predict analytically what the optimum bias should be for a specific circuit. The nominal value is of the order of the voltage drop across the load diode 48 when conducting. However, the optimum bias value may differ markedly from this nominal value; for example, the optimum value, under certain conditions, may permit a certain amount of secondary current. To find the optimum value of this bias, one would set the circuit in operation with the nominal value for the sources 42 and, then, vary the voltages of these sources 42 in small increments and, at the same time, vary the driving voltage over a range. The optimum bias value would be that permitting a maximum driving voltage range for stable circuit operation.

Circuit design also involves consideration of the signal-to-noise ratio and of power efficiency. Signal pulse amplitudes and, generally, the signal-to-noise ratio are optimums when the magnetic cores are being driven fully to saturation during resetting and gating. Power efficiency is at an optimum when the driving voltages are not unnecessarily large for optimum signal levels and stable operation. The bias sources 42 assist in obtaining optimum signal levels and power efficiency.

Stable circuit operation may be provided over a wider range of driving voltages by means of separate resistors (not shown) connected in shunt with the primary-circuit diodes 24. Such resistors would provide a current path for the gating voltage to remove spurious partial resetting of the cores and, thereby, prevent the loss of signal pulses.

The load circuits 40, 54, 56, 58 may have the direct voltage sources connected in the bias current loop as shown in Figure 4. The voltage sources 92, 94 and the resistor 96 determine the bias current, and the source 94 determines the voltage level of the anode of the diode 48 with respect to ground. The quiescent voltage at the terminal 44 with respect to ground is the difference between the voltage drop across the diode 48 and the voltage supplied by the source 94.

The circuit of Figure 1 may be inverted by inverting the polarities of all the diodes and of the direct voltage sources. Such inversions of the circuit connections would result in an inversion of the signal pulse polarity from positive-going to negative-going.

In a circuit that was operated successfully, the magnetic cores were made of 4–79 Mo-Permalloy tape ⅛ inch wide and ⅛ mil thick, 15 wraps of this tape on a bobbin 0.313 inch in diameter. Each primary winding 20 had 204 turns, and each secondary 22 had 340 turns. The diodes were type T7G (Transitron). The resistors 96 in the load were 4700 ohms; the voltages sources 92 were 45 volts; the sources 94 were of the order of 1 volt; the primary and secondary A.-C. voltages were respectively 13.8 and 23.0 volts, peak to peak.

Thus, a new and improved magnetic core shift register is provided. The development of spurious signals is prevented to ensure reliable operation.

We claim:

1. A magnetic circuit comprising a plurality of saturable magnetic elements each having appreciable remanence; separate windings linked to said elements; and circuit means coupling said winding of a first one of said elements to said winding of a second one of said elements, said circuit means including two series circuits, each of said series circuits including a different unilateral impedance, a different means for applying voltage pulses, and a load impedance in common with the other of said two series circuits all connected in series with a different one of said first and second element windings; said common load impedance including a unilateral impedance, and means for biasing said load unilateral impedance to tend to draw current therethrough in a forward direction; said circuit means further including means in at least one of said series circuits for supplying a voltage in a direction to neutralize the effect of a forward voltage drop across said load unilateral impedance.

2. A magnetic circuit comprising a plurality of saturable magnetic elements each having appreciable remanence, separate first and second windings linked to said elements, and circuit means coupling said second winding of a first one of said elements to said first winding of a second one of said elements, said circuit means including two series circuits, each of said series circuits including a different unilateral impedance, a different means for applying voltage pulses, and a load impedance in common with the other of said two series circuits all connected in series with a different one of said first element second winding and said second element first winding, said common load impedance including a unilateral impedance, and means for biasing said load unilateral impedance to tend to draw current therethrough in a forward direction, said circuit means further including means in at least one of said series circuits for applying a voltage to tend to neutralize a forward voltage drop across said load unilateral impedance and to oppose forward current flow in the one of said unilateral impedances connected in series with said first element second winding upon the application of a current to said first element first winding.

3. A magnetic circuit comprising a plurality of magnetic elements having substantially rectangular hysteresis characteristics and operatively arranged in order, separate first and second windings linked to said elements, and separate circuit means coupling said second winding of each of a plurality of said elements to said first winding of the succeeding one of said elements, each of said circuit means individually including a first and a second series circuit respectively connected to the preceding core second winding and the succeeding core first winding, each of said first and second series circuits including a different unilateral impedance, a different means for applying voltage pulses, and a load impedance in common with the other of said two series circuits of the same circuit means, each of said common load impedances individually including a unilateral impedance, and means for biasing said load unilateral impedance to tend to draw current therethrough in a forward direction, said circuit means further including means in at least said first series circuits for continuously applying a direct voltage in a direction to oppose forward current through said unilateral impedances in said first series circuits.

4. A magnetic circuit comprising a plurality of magnetic elements having substantially rectangular hysteresis characteristics and operatively arranged in order, separate first and second windings linked to said elements, and separate circuit means coupling said second winding of each of a plurality of said elements to said first winding of the succeeding one of said elements, each of said circuit means individually including a first and a second series circuit respectively connected to the preceding core second winding and the succeeding core first winding, each of said first and second series circuits respectively including a different first and second unilateral impedance, a different means for applying voltage pulses to said first and second windings in directions tending respectively to produce oppositely directed magnetizing forces in the same core, and a load impedance in common with the other of said two series circuits of the same circuit means, each of said common load impedances individually including a unilateral impedance poled in the opposite direction to the associated first and second unilateral impedances, and further including means for biasing said load unilateral impedance to tend to draw current therethrough in a forward direction, said circuit means further including means in at least said first series circuits for continuously applying a direct voltage in a direction to oppose forward current through said first unilateral impedances.

5. A magnetic circuit comprising a plurality of magnetic elements having substantially rectangular hysteresis characteristics and operatively arranged in order, separate first and second windings linked to said elements, and separate circuit means coupling said second winding of each of a plurality of said elements to said first winding of the succeeding one of said elements, each of said circuit means individually including a first and a second series circuit respectively connected to the preceding core second winding and the succeeding core first winding, each of said first and second series circuits respectively including a different first and second unilateral impedance, a different means for applying voltage pulses to said first and second windings in directions tending respectively to produce oppositely directed magnetizing forces in the same core, and a load impedance in common with the other of said two series circuits of the same circuits means, each of said common load impedances individually including a unilateral impedance poled in the opposite direction to the associated first and second unilateral impedances, and further including means for biasing said load unilateral impedance to tend to draw current therethrough in a forward direction, said circuit means further including means connected in common with said first and second series circuits for continuously applying a direct voltage in a direction to oppose forward current through said first unilateral impedances.

6. A magnetic circuit as recited in claim 5 wherein each of said load impedances further includes a different resistor connected in a series combination with said biasing means of the load impedance, each of said load unilateral impedances being connected across the associated one of said series combinations, said means for continuously applying a direct voltage is connected in series with the parallel combinations of said series combinations and said load impedances.

7. A magnetic circuit as recited in claim 5 wherein each of said load impedances further includes a different resistor connected in a first series combination with said biasing means of the load impedance, each of said load unilateral impedances is connected in a second series combination with said means for continuously applying a direct voltage, each of said second series combinations being connected in parallel with the associated one of said first series combinations.

References Cited in the file of this patent

UNITED STATES PATENTS

| | | |
|---|---|---|
| 2,652,501 | Wilson | Sept. 15, 1953 |
| 2,678,965 | Ziffer | May 18, 1954 |
| 2,691,154 | Rajchman | Oct. 5, 1954 |
| 2,691,156 | Saltz | Oct. 5, 1954 |
| 2,734,185 | Warren | Feb. 7, 1956 |
| 2,768,312 | Goodale | Oct. 23, 1956 |
| 2,769,925 | Saunders | Nov. 6, 1956 |

FOREIGN PATENTS

| | | |
|---|---|---|
| 748,558 | Great Britain | May 2, 1956 |